(No Model.)
A. W. WALKER.
PIPE SECTION DAMPER.
No. 492,854. Patented Mar. 7, 1893.
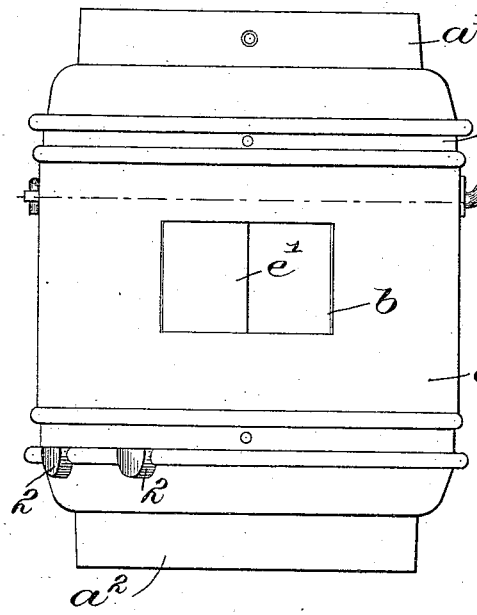
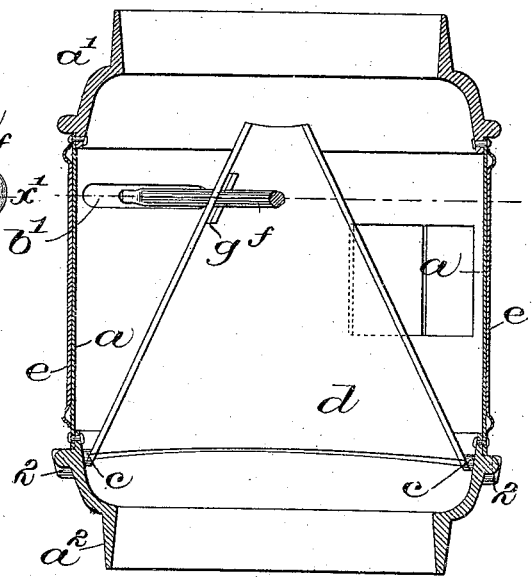
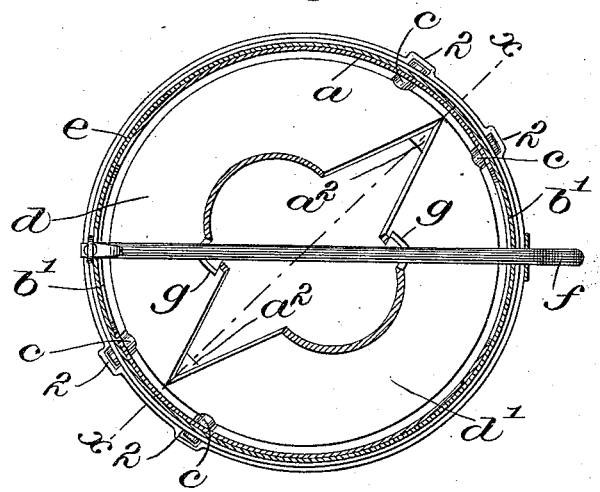
Witnesses.
Edward F. Allen
Fred S. Greenleaf
Inventor.
Arthur W. Walker
by Crosby & Gregory
Attys.

UNITED STATES PATENT OFFICE.

ARTHUR W. WALKER, OF MALDEN, MASSACHUSETTS.

PIPE-SECTION DAMPER.

SPECIFICATION forming part of Letters Patent No. 492,854, dated March 7, 1893.

Application filed August 23, 1892. Serial No. 443,879. (No model.)

*To all whom it may concern:*

Be it known that I, ARTHUR W. WALKER, of Malden, county of Middlesex, State of Massachusetts, have invented an Improvement in Pipe-Section Dampers, of which the following description, in connection with the accompanying drawings, is a specification, like letters and numerals on the drawings representing like parts.

This invention has for its object to improve that class of damper adapted to be interposed in a smoke pipe and so constructed that as the area of the smoke space is contracted to check the draft in the fire box, a portion of the pipe section will be opened to admit outside air into the smoke pipe, and vice versa.

Figure 1, in side elevation represents a pipe section damper embodying my invention. Fig. 2, a section in the line $x$, Fig. 3; and Fig. 3, a section in the line $x'$, Fig. 1.

The shell or body of the pipe section is composed of a piece of metal pipe $a$, suitably attached by rivets or otherwise to cast metal end pieces $a'$, $a^2$, the pipe $a$, having preferably at substantially diametrically opposite points like cold air inlets $b$, see Figs. 1 and 2, and two like horizontal slots $b'$. The end piece $a^2$ has made in its upper edge suitable bearings 2, to receive the journals $c$ fixed to and preferably integral with the semi-cones $d$, $d'$, preferably of cast metal for sake of strength and durability, said journals being seated in said bearings and kept therein in a durable manner by the lower end of the pipe $a$. Outside this pipe $a$ I have mounted a damper ring $e$, and have provided the ring with openings $e'$ to register with the openings $b$ when it is desired to admit cold air into the smoke pipe.

The damper ring is provided with a rod $f$ which is extended through like openings $g$ in the journaled semi-cones $d$, $d'$.

When the operator engages the outer end of the rod and turns the outer or damper ring to open or close the cold air inlets, he at the same time by the movement of the rod $f$ turns the semi-cones on their journals and closes said cones together to check the smoke or gas area of the smoke pipe section, and vice versa.

In my invention the damper ring is located outside the main body of the pipe, and consequently the gases, smoke, &c., do not pass between the damper ring and body $a$, as would be the case if the ring $e$ were located within the body $a$, and consequently, as will be obvious, ashes, soot, and rust due to smoke and dampness cannot accumulate between the ring damper and body $a$, and the ring damper is always in condition to be moved freely and easily.

In my invention the semi cones by being mounted on the end piece $a^2$ are not carried about the center of the pipe section when being opened and closed as would have to be the case if the semi-cones were pivoted on the damper ring located inside the shell $a$.

Having described my invention, what I claim as new, and desire to secure by Letters Patent, is—

1. In a pipe section damper, a stationary body, an external movable shell on said body, and a stationary end-piece attached to said body, said end-piece having bearings, combined with semi-cones journaled in said bearings and operatively connected with the said external movable shell, substantially as described.

2. The combination, substantially as described, of the stationary body $a$, externally surrounding movable shell $e$, stationary end-piece having bearings 2 and fixed to the body, semi-cones journaled in said bearings and a transverse rod $f$ fixed to the movable shell and engaging the semi-cones substantially as described.

3. The body $a$, slotted as described at $b'$ and having a cold air inlet, end pieces $a'$, $a^2$, connected thereto, the piece $a^2$ having bearings; and notched semi cones having journals entering said bearings and having a movement only in said bearings; combined with an exterior damper shell $e$ having a cold air inlet, and a rod carried by said ring and extended diametrically across the same through the notches in the semi cones and the slots in the said body, to operate, substantially as described.

In testimony whereof I have signed my name to this specification in the presence of two subscribing witnesses.

ARTHUR W. WALKER.

Witnesses:
GEO. W. GREGORY,
EMMA J. BENNETT.